United States Patent
Chen et al.

(10) Patent No.: US 9,728,209 B2
(45) Date of Patent: Aug. 8, 2017

(54) THERMALLY ROBUST NEAR-FIELD TRANSDUCER PEG

(71) Applicant: Seagate Technology LLC, Cupertino, CA (US)

(72) Inventors: Weibin Chen, Bloomington, MN (US); Martin Blaber, Plymouth, MN (US); Tong Zhao, Eden Prairie, MN (US); Michael Christopher Kautzky, Eagan, MN (US); John Charles Duda, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/163,035

(22) Filed: May 24, 2016

(65) Prior Publication Data

US 2016/0351209 A1 Dec. 1, 2016

Related U.S. Application Data

(60) Provisional application No. 62/166,998, filed on May 27, 2015, provisional application No. 62/167,321, filed on May 28, 2015.

(51) Int. Cl.
| | |
|---|---|
| *G11B 11/00* | (2006.01) |
| *G11B 5/02* | (2006.01) |
| *G11B 5/31* | (2006.01) |
| *G11B 5/00* | (2006.01) |

(52) U.S. Cl.
CPC .......... *G11B 5/314* (2013.01); *G11B 5/3116* (2013.01); *G11B 5/3133* (2013.01); *G11B 2005/0021* (2013.01)

(58) Field of Classification Search
CPC ..... G11B 5/332; G11B 5/2452; G11B 5/4907; G11B 2005/0021; G11B 2005/0005; G11B 5/3903; B82Y 25/00; B82Y 10/00
USPC ............. 360/59, 313, 328; 369/13.13, 13.24, 369/13.17, 112.23, 112.27
See application file for complete search history.

(56) References Cited

U.S. PATENT DOCUMENTS

| | | | |
|---|---|---|---|
| 8,891,205 B2 * | 11/2014 | Zhou ...................... | G11B 13/08 360/125.3 |
| 2010/0214685 A1 | 8/2010 | Seigler et al. | |
| 2011/0002199 A1 | 1/2011 | Takayama et al. | |
| 2013/0279315 A1 | 10/2013 | Zhao et al. | |
| 2013/0286799 A1 | 10/2013 | Zhu et al. | |

(Continued)

OTHER PUBLICATIONS

Aug. 18, 2016, International Search Report and Written Opinion dated Aug. 18, 2016 for PCT Application No. PCT/US2016/033903, 10 pages.

*Primary Examiner* — Nabil Hindi
(74) *Attorney, Agent, or Firm* — Hollingsworth Davis, LLC

(57) ABSTRACT

A near-field transducer includes first and second stacked base portions having a common outline shape. The second base portion is proximate alight delivery structure. A peg extends from the first base portion towards a media-facing surface. The peg includes a material that is more thermally robust than a plasmonic material of the base portion. The peg has a peg thickness that is less than a thickness of the first base portion. The first base portion has a first recess proximate the peg. The first recess separates the first base portion from the media-facing surface and exposes at least a top side of the peg.

19 Claims, 7 Drawing Sheets

(56) References Cited

U.S. PATENT DOCUMENTS

| | | |
|---|---|---|
| 2014/0269237 A1 | 9/2014 | Sasaki et al. |
| 2014/0376342 A1 | 12/2014 | Wessel et al. |
| 2014/0376348 A1 | 12/2014 | Cheng |
| 2015/0117170 A1 | 4/2015 | Zhao et al. |
| 2015/0131417 A1 | 5/2015 | Zhao |
| 2015/0279399 A1 | 10/2015 | Chen et al. |

\* cited by examiner

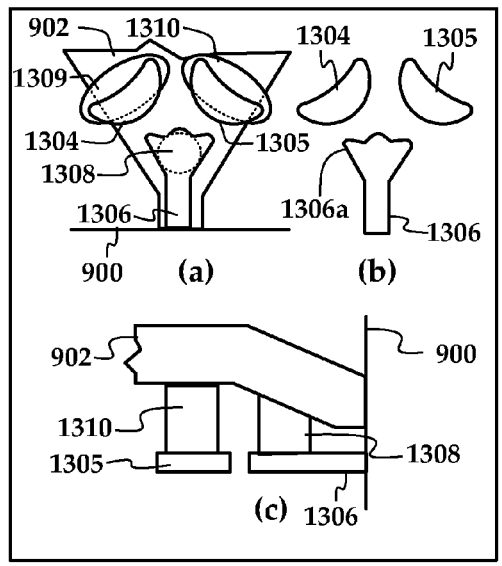
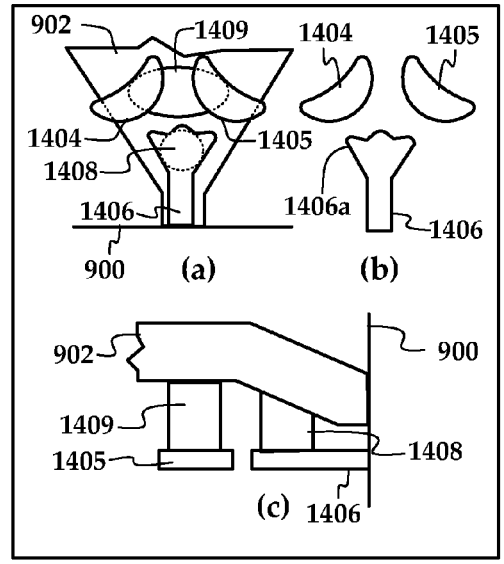
FIG. 13                FIG. 14
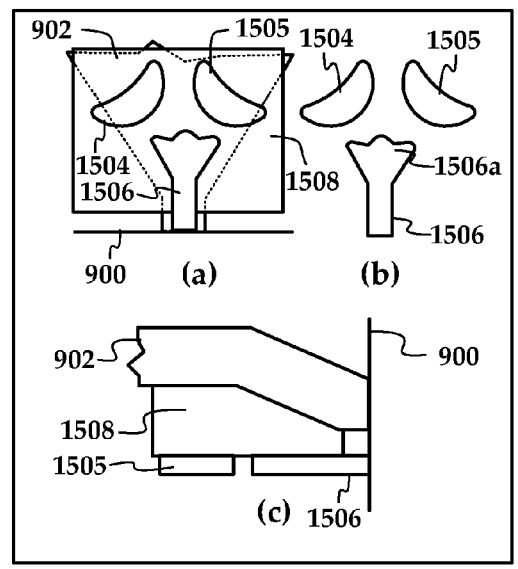
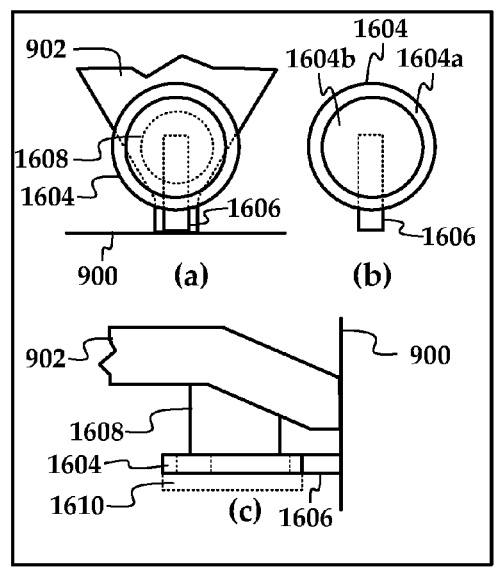
FIG. 15                FIG. 16

THERMALLY ROBUST NEAR-FIELD TRANSDUCER PEG

RELATED PATENT DOCUMENTS

This application claims the benefit of Provisional Patent Application Ser. No. 62/166,998 filed on May 27, 2015, and Provisional Patent Application Ser. No. 62/167,321 filed on May 28, 2015, to which priority is claimed pursuant to 35 U.S.C. §119(e), and both of which are incorporated herein by reference in their entireties.

SUMMARY

The present disclosure is directed to a near-field transducer with a thermally robust peg. In one embodiment, a near-field transducer includes first and second stacked base portions comprising a common outline shape. The second base portion is proximate a light delivery structure, and the first and second base portions are formed of a plasmonic material. A peg extends from the first base portion towards a media-facing surface. The peg includes a material that is more thermally robust than the plasmonic material. The peg has a peg thickness that is less than a thickness of the first base portion. The first base portion has a first recess proximate the peg. The first recess separates the first base portion from the media-facing surface and exposes at least a top side of the peg. A heat sink is proximate the first base portion. The heat sink includes an angled surface that is proximate to a write pole.

In another embodiment, a near-field transducer includes a base portion formed of a plasmonic material and a peg embedded within the base portion. The peg extends from a center of the base portion towards a media-facing surface. The peg includes a peg material that is more thermally robust than the plasmonic material. A heat sink on a major surface of the base portion has an angled surface that is proximate to a write pole.

In another embodiment, a near-field transducer has a base portion with first and concentric sections that are formed of first and second materials. At least one of the first and second materials is a plasmonic material. A peg extends from the base portion towards a media-facing surface. The peg includes a peg material that is more thermally robust than the plasmonic material. A heat sink on a major surface of the base portion has an angled surface that is proximate to a write pole.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 9-20 are each diagrams showing multiple views of near-field transducer arrangements according to additional embodiments.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disc during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disc, nano-patch, nano-rod, etc.

Generally, the NFT is formed by depositing thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal robustness of the NFT, such as at a peg that extends towards the recording media.

Figure 1:
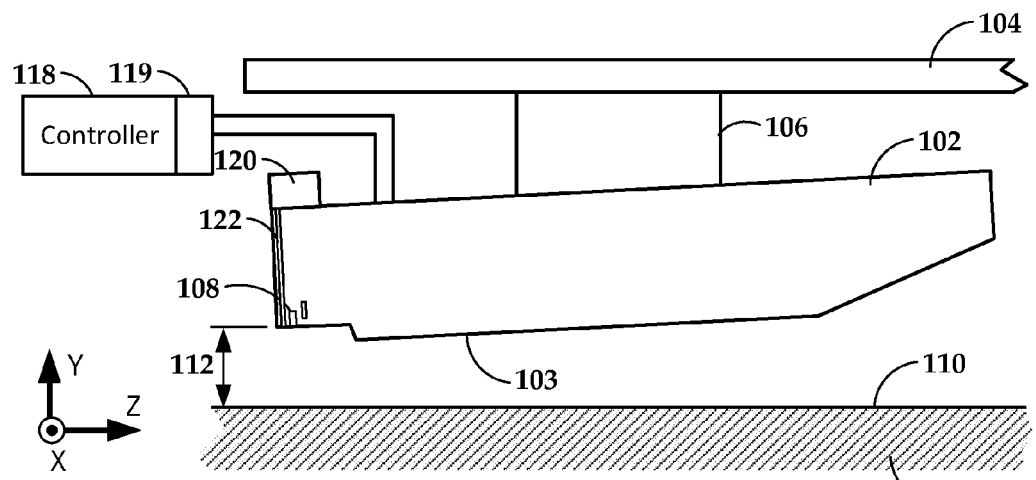
FIG. 1 is a block diagram of a hard drive slider and media arrangement according to an example embodiment.

In reference now to FIG. 1, a block diagram shows a side view of a read/write head 102 according to an example embodiment. The read/write head 102 may be used in a magnetic data storage device, e.g., HAMR hard disc drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disc. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
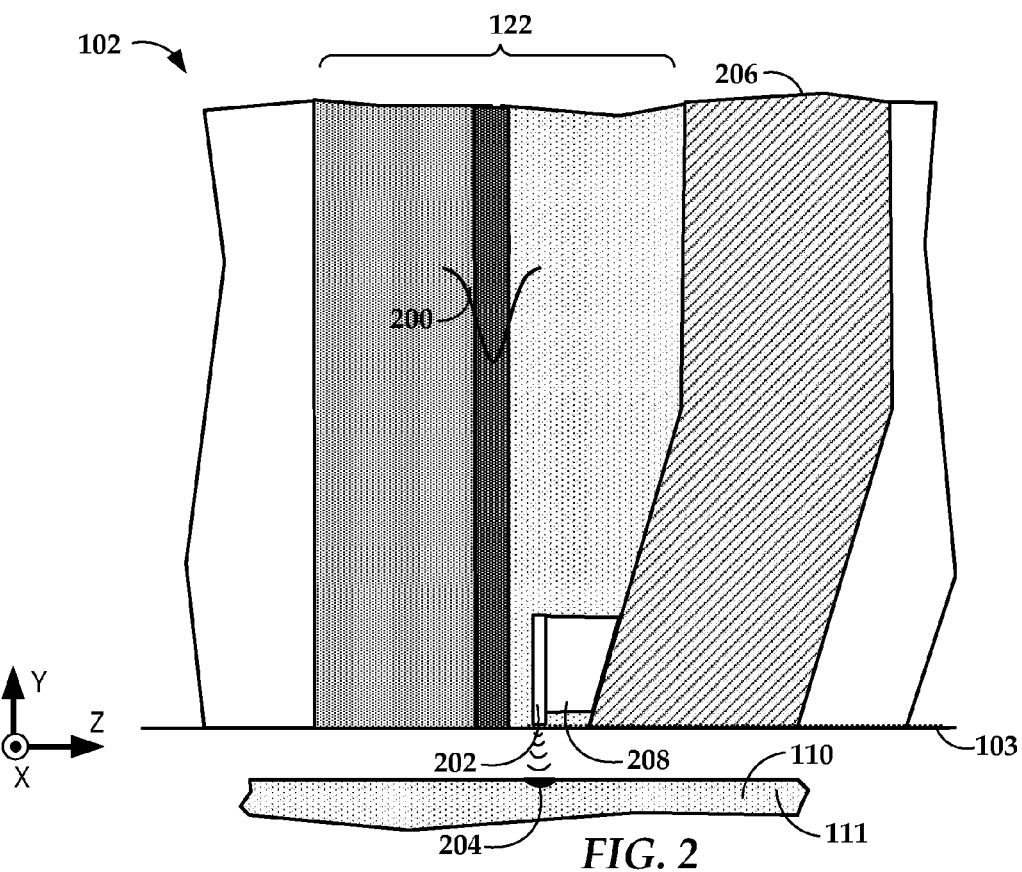
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, techniques described herein facilitate increasing thermal robustness of the near-field transducer.

Figure 3:
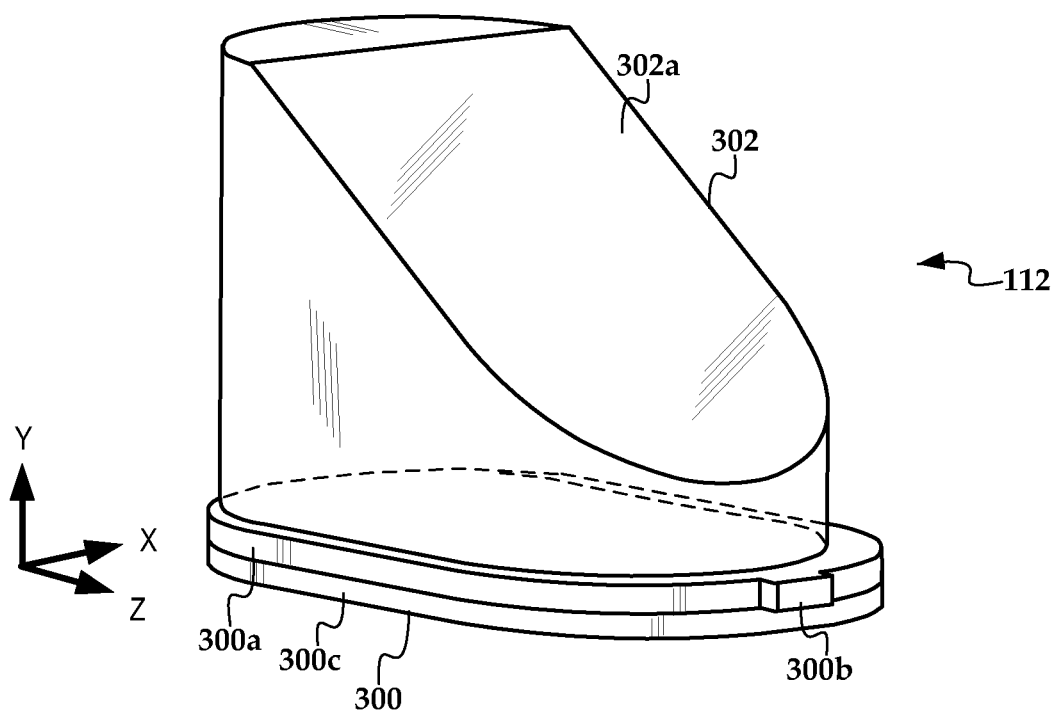
FIG. 3 is a perspective view of a near-field transducer according to an example embodiment.

In FIG. 3, a perspective views show details of an NFT 112 according to an example embodiment. The NFT 112 includes two parts: a base part 300 and a heat sink 302 proximate to (e.g., deposited directly on to) the base part 300. In this example, the outline of the base part 300 on the xz-plane (which is a substrate-parallel plane) is enlarged relative to the heat sink 302, although they may be the same size. The heat sink 302 includes an angled surface 302a that is located proximate to a write pole (see, e.g., write pole 206 in FIG. 2).

The base part 300 includes base portion 300a that acts as a collector of optical energy from a waveguide and/or focusing element. The base portion 300a achieves surface plasmon resonance in response to the optical energy and the surface plasmons are directed to the medium via a peg 300b that extends from base portion 300a. In this example, the base portion 300a is configured as an elongated plate with rounded (e.g., circular) ends, also referred to as a stadium or capsule shape. Other enlarged portion geometries may be used, including circular, rectangular, triangular, etc.

As noted above, the peg 300b may be susceptible to damage from high temperature and other factors such as head-to-disc contact. As such, in embodiments described herein, the peg is made from a refractory material such as Rh, Ir, Pt, Pd, W, Ru, ZrN, TiN, etc., that are thermally robust, e.g., have high melting temperatures, retain shape at high temperatures. One issue with these materials is that their optical performance (e.g., thermal gradient, thermal confinement) is generally worse than good plasmonic materials like Au, Ag, Cu, or Al, and so these thermally robust materials will be referred to as refractory materials, as they are not generally used to form near-field transducers or other plasmonic resonating devices.

The optical properties of the refractory materials compared to Au/Ag/Al lead to a higher absorption in the materials themselves, resulting in relatively larger self-heating and lower media heating. However, it is still desirable to utilize these materials in at least the peg 300b because they are generally more thermally robust and therefore more damage-resistant than commonly-used NFT materials. In this specification, some design features are explored to improve the performance of a thermally robust peg used in an NFT configured similarly to the illustrated NFT 112 shown in FIG. 3.

Three design features were analyzed using a thermally robust NFT peg. Those features include a sunken disc and recessed top disc, a flared peg, and a bottom cladding disc. The term "sunken disc" refers to a base portion that extends below the peg, as shown by second base portion 300c in FIG. 3. Generally, the first base portion the second base portion 300b has the same outline shape as the first base portion 300a (e.g., stadium shape) as well as a same outline size, although the outline size may differ in some cases. The peg 300b extends beyond the enlarged portion 300c. The enlarged portion 300c is disposed proximate a light delivery structure (e.g., a waveguide core) and away from a write pole.

Figure 4:
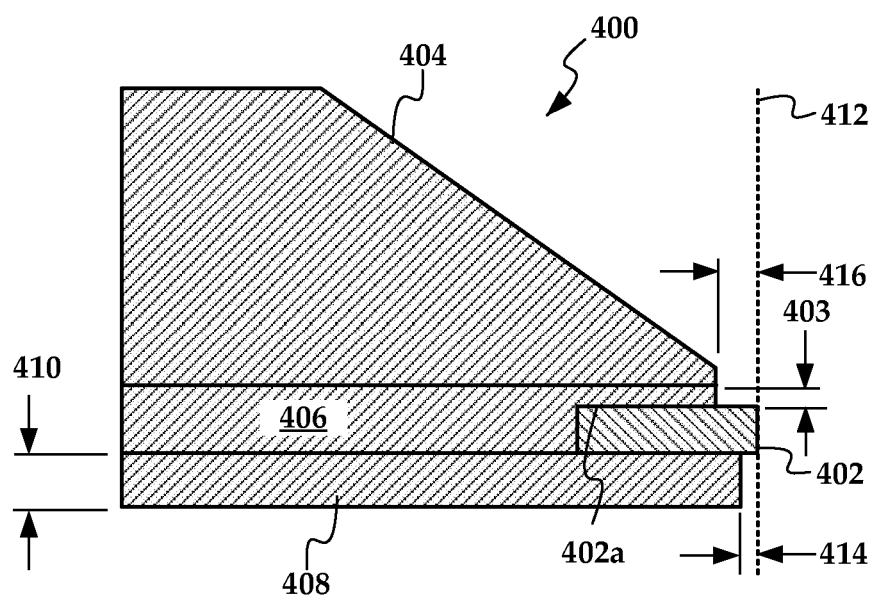
FIG. 4 is a cross-section view of a near-field transducer according to an example embodiment.

In FIG. 4, a cross-sectional view shows an NFT 400 with a thermally robust peg 402 and a sunken disc according to an example embodiment. The NFT 400 also includes a heat sink 404, and first and second base portions 406, 408 that have a stadium shape as shown in FIG. 3. The peg 402 has a thickness that is less than a thickness of the first base portion 406, such that a step dimension 403 is defined between a top surface of the peg 402 and a top surface of the first base portion 406. All of the embodiments shown in FIGS. 4-7 and described below also have an analogous step dimension.

The second base portion 408, also referred to as a sunken disc, has a thickness 410 of about 30 nm, e.g., between 20-70 nm. Line 412 represents a media-facing surface and an end of the second base portion 408 is separated from the media-facing surface 412 by a second recess 414 of about 10-30 nm. An end of the first base portion 406 (also referred to as a top disc or top stadium) is separated from the media-facing surface 412 by a first recess 416 of about 30-60 nm. The first recess 416 exposes at least a top surface 402a of the peg 402.

The first recess 416 also extends to truncate the heat sink 404 near the media-facing surface 412.

Figure 5:
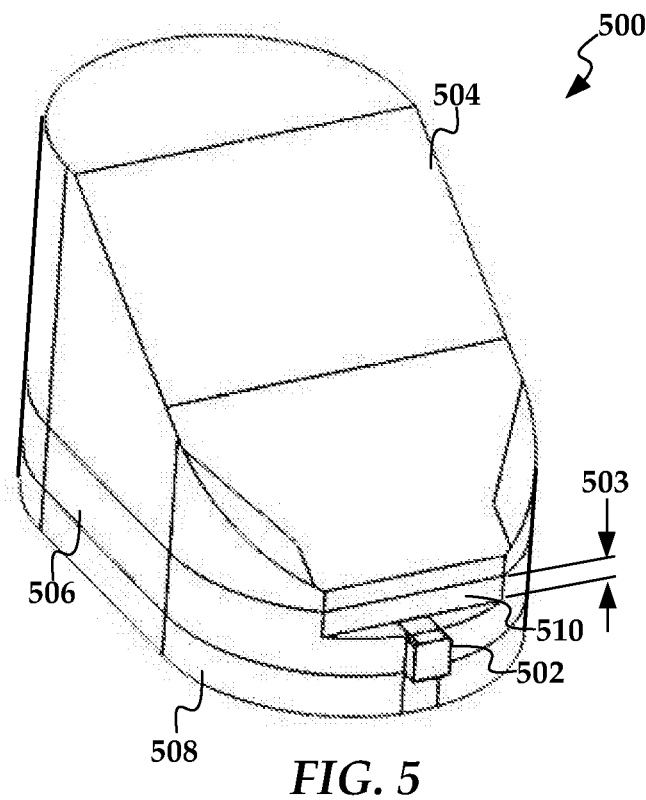
FIG. 5 is a perspective view of a near-field transducer according to an example embodiment.
Figure 6:
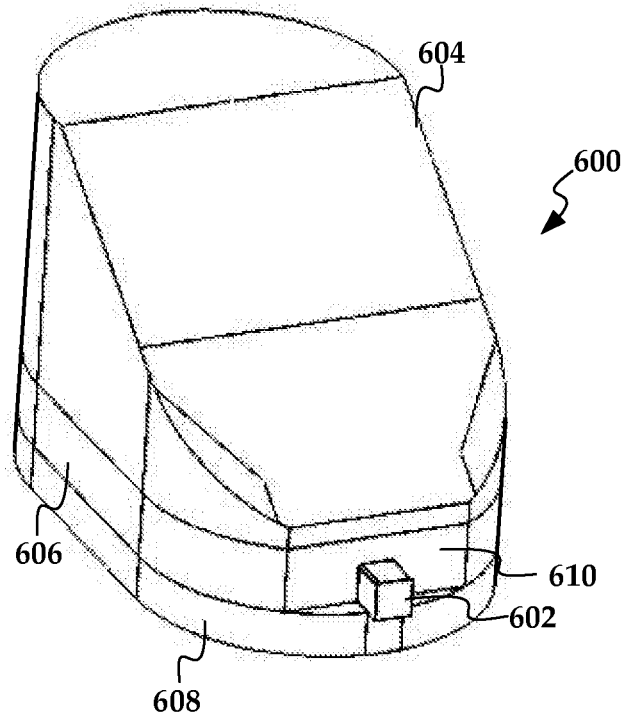
FIG. 6 is a perspective view of a near-field transducer according to an example embodiments.

In FIGS. 5 and 6, perspective views illustrate two variations on the sunken disc configuration according to example embodiments. In FIGS. 5 and 6, NFTs 500 and 600 include pegs 502, 602, heat sinks 504, 604, first base portions 506, 606, and second base portions 508, 608. The NFT 500 includes a recess 510 that is cut in the first base portion 506 above the peg 502 such that only a top of the peg 502 is exposed but the sides of the peg 502 are covered (at least to the extent of the outline shape of the first and second base portions 506, 508). The recess 510 is the same dimension as the step dimension contour of the first base portion 506 is unchanged around the peg 502. By way of contrast, the NFT 600 includes a recess 610 that is cut all the way through (e.g., through the full thickness of) the first base portion 610, such that sides of the peg 602 are exposed as well as a top of the peg 602.

Testing shows that the configuration in FIG. 5 provides better heat sinking. In particular, for the NFT 500 configuration, analysis of performance under expected conditions shows thermal gradient (abbreviated herein as "TG", and referring to the thermal gradient of a hotspot applied to the recording media) is 5.0 K/nm, peg temperature is 145 K, and change in temperature as a function of power (MT) is 46 K/mW. For the NFT 600 configuration under the same conditions, TG is 5.42 K/nm, peg temperature is 265 K, and MT is 42.4 K/mW.

Figure 7:
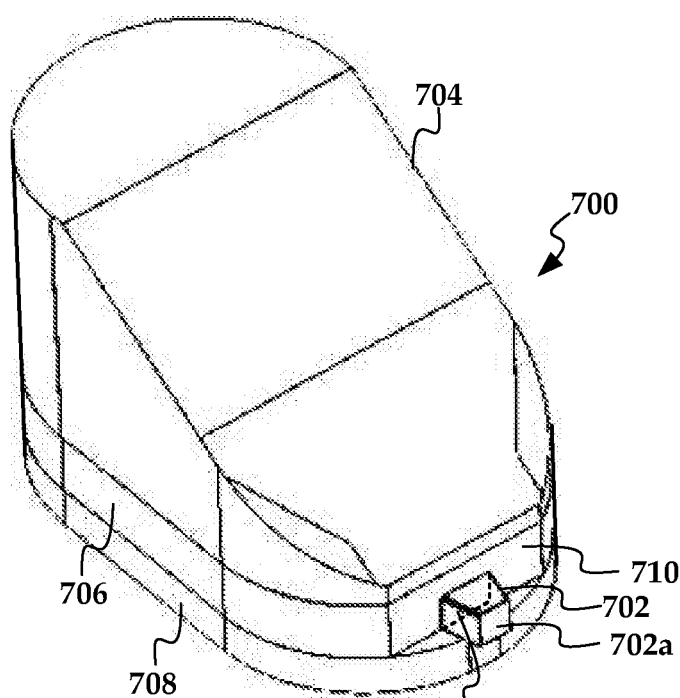
FIG. 7 is a perspective view of a near-field transducer according to an example embodiments.

In FIG. 7, a perspective view shows an NFT 700 with a flared/tapered peg 702 according to an example embodiment. The NFT 700 also includes a heat sink 704, a first base portion 706, and a second base portion 708. The taper is formed such that a first cross-section 702a of the peg proximate the media-facing surface is smaller than a second cross section proximate the first base portion 706. Table 1 below shows a comparison of performance under expected conditions for different flare angles. Flare angle of zero corresponds to the configuration 600 shown in FIG. 6. The flare lowers peg temperature, at the expense of lower thermal gradient.

TABLE 1

| Flare angle (deg) | TG (K/nm) | Peg ΔT (K) | MT (K/mW) |
|---|---|---|---|
| 0 | 5.42 | 265 | 42.4 |
| 15 | 5.0 | 168 | 45 |
| 20 | 4.9 | 156 | 45 |

Figure 8:
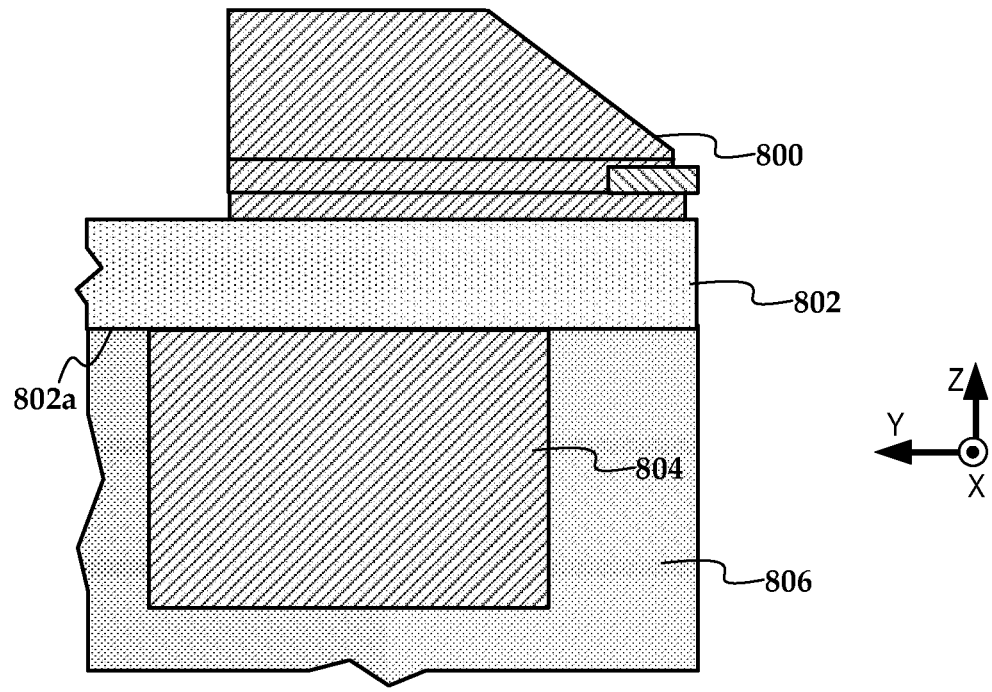
FIG. 8 is a cross-section view of a near-field transducer according to an example embodiment.

In FIG. 8, an NFT 800 (in this example having a configuration similar to NFT 500 in FIG. 5) is shown in a cross section view over a waveguide core 802. A plasmonic disc 804 is below the waveguide core 802, e.g., near a surface 802a of the core 802 that faces away from the NFT 800. The plasmonic disc 804 is shown here embedded in a bottom cladding layer 806, and so the disc 804 may alternatively referred to as a bottom cladding disc. The bottom cladding disc 804 is formed of a plasmonic material (e.g., Au, Ag, Al, Cu) and may be in the form of a disc (e.g., having a circular or stadium outline on the substrate-parallel, xy-plane) or any other shape (e.g., rectangular plate, cuboid, etc.). The bottom cladding disc 804 at least partially overlaps the NFT 800, e.g., a projection of the bottom cladding disc 804 onto the xy-plane (which is a substrate parallel plane in this example) overlaps a projection of the NFT 800 on the same plane.

As noted above, the analysis for the NFT 500 without a bottom cladding disc resulted in TG of 5.0 K/nm, peg temperature of 145 K, and MT of 46 K/mW. With the bottom cladding disc 804, an analysis of the NFT 800 under the same conditions resulted in TG of 5.5 K/nm, peg temperature of 167 K, and MT of 47 K/mW. The bottom cladding disc 804 results in a 10% improvement in TG as well as an improvement in efficiency, although peg temperature increases by 22 K.

In Table 2 below, the results of the analysis on the various designs described above. The original design includes a thermally robust peg, but without a sunken disc. Generally, the design 500 in FIG. 5 results in minimal change in peg temperature compared to the original, yet provides a significant increase in thermal gradient. For example, with a sunken disc and recessed top disc, thermal gradient can be improved by 57% with no significant temperature penalty. Thermal gradient can be further improved by another 15% by integrating a bottom cladding disc.

TABLE 2

| Configuration | Design features | TG | PegΔT |
|---|---|---|---|
| — | Original | 3.18 | 142 |
| 500 | Sunken + full disc | 5.0 | 145 |
| 600 | Sunken | 5.42 | 265 |
| 700 | Config. 600 with flared/tapered peg | 4.9 | 156 |
| 800 | NFT 500 with bottom cladding disc | 5.5 | 155 |

Any of the embodiments described above may use any combination of disclosed thermally robust material for the peg and disclosed plasmonic material for the other structures (e.g., NFT base portions, bottom cladding disc). Also, combinations of disclosed material may be used in individual components, e.g., layers of different thermally robust materials may form the peg, layers of plasmonic and thermally robust materials may form the peg and/or other (non-peg) parts of the NFT, and layers of different plasmonic materials may be used to form the other (non-peg) parts of the NFT. Further, any of the disclosed features shown in Table 2 may be combined. For example, the NFT configuration 500 may use a tapered peg, with or without a bottom cladding disc. Similarly, configuration 600 may be used with a bottom cladding disc, with or without a tapered peg.

In some embodiments, the relationship between the optical properties of the peg material and disc material is may be selected to ensure that the size of the optical spot is not too large. The optical properties of the peg and disc materials can be described by their "relative permittivity", $\epsilon$. Where $\epsilon$ is a material dependent, complex, optical frequency ($\omega$) dependent quantity of the form $\epsilon(\omega)=\epsilon_r(\omega)+i\epsilon_i(\omega)$ that is related to the material refractive index: $\epsilon r(\omega)=n(\omega)2-k(\omega)2$, $\epsilon i(\omega)=2*n(\omega)*k(\omega)$. The real part of the permittivity, $\epsilon_r(\omega)$, describes the electric field distribution in the material, and the imaginary part, $\epsilon_i(\omega)$, describes the amount of energy lost to heating. To excite a plasmon resonance on the disc at a particular incident laser wavelength, either (1) the size and shape of the disc can chosen to support the resonance, and $\epsilon_r(\omega)$ of the disc is less than zero; or (2) the $\epsilon_r(\omega)$ of the material is chosen such that the given size and shape supports a resonance.

In FIGS. 9-20, composite views show NFT configurations according to additional embodiments. For purposes of convenience, the write pole and media-facing surface are assigned reference numbers 902 and 900, respectively in all of FIGS. 9-20. In each of FIGS. 9-20, view (a) is a plan view of a substrate-parallel plane of an NFT, heat sink, and write pole 902 near a media-facing surface 900, where the write pole 902 is at the bottom. In these figures, view (b) is a plan view of just the NFT, and view (c) is a side view of an NFT, heat sink, and write pole 902 near a media-facing surface 900. In each case, the size and shape, relative position and material of both the base portions and associated pegs are chosen such that the base portions convert incident photons into plasmons. The plasmon is coupled from the base portions to the pegs, the pegs coupling energy into a magnetic storage medium.

In the embodiments of FIGS. 9-20, based portions, pegs, and heatsinks may be made of similar, identical or distinct materials. In particular embodiments, the pegs may be made of a thermally robust material described above and the base portions and heat sinks may be made of plasmonic materials. Also, in the embodiments shown in FIGS. 9-20 where the peg is embedded in a base portion, the base portions may include recesses that expose a top side of the peg, and the peg may have a thickness that is less than that of the base portion in which the peg is embedded. Any of the embodiments shown in FIGS. 9-20 may also be used with a waveguide (e.g., waveguide core) proximate the base portion(s), and may also include a plasmonic disc that is located on a side of the waveguide that faces away from the base portion(s).

Figure 9:
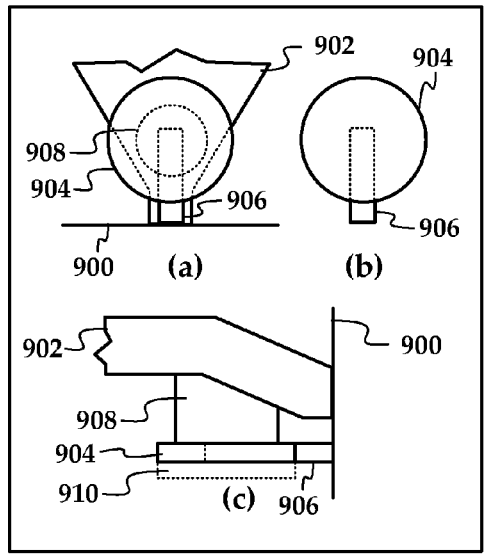

In FIG. 9, an NFT includes a disc-style base portion 904 and a peg 906. The peg 906 is rod-shaped and extends to a middle of the base portion 904. The base portion 904 is has a circular contour/outline in this example, although a stadium shape may also be used. A heat sink 908 has a contour/outline that follows that of the base portion 904 (circular outline in this example, although could be stadium shaped when used with a stadium-shaped base portion) and extends from a major surface of the base portion 904 to the write pole 902. The heat sink 908 has a smaller contour than the base portion 904 in this example, although the heat sink's contour may be the same size as that of the base portion 904 in some embodiments. A lower base portion 910 may optionally be used. The lower base portion 910 extends from a second major surface of the base portion 904 away from the heat sink 902. An outer surface of the lower base portion 910 may be proximate a light delivery structure, e.g., waveguide (not shown).

Figure 10:
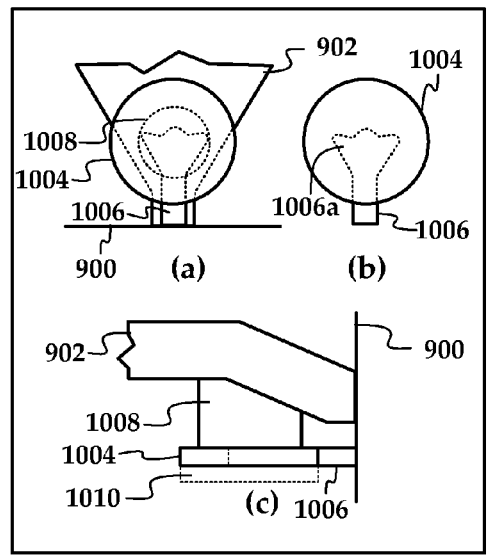

In FIG. 10, an NFT includes a circular disc-shaped base portion 1004 and a peg 1006. The peg 1006 has a flared end 1006a that extends to a middle of the base portion 1004. The flared end 1006a is a geometrical structure that improves adhesion and/or plasmonic coupling between the peg 1006 and base portion 1004. A stadium shape may instead be used for the outer contours of the base portion 1004. A heat sink 1008 has a contour that follows that of the base portion 1004 and extends from a major surface of the base portion 1004 to the write pole 902. The heat sink 1008 has a smaller contour than the base portion 1004 in this example, although its contour may be the same size as that of the base portion 1004 in some embodiments. A lower base portion 1010 may optionally be used similar to the lower base portion 910 in the description of FIG. 9.

Figure 11:
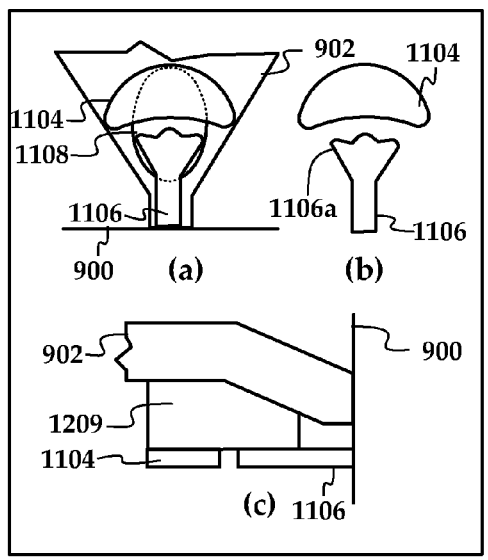

In FIG. 11, an NFT includes a crescent-shaped base portion 1104 and a peg 1106. The peg 1106 has a flared end 1106a that extends towards the base portion 1104, however the peg 1106 and base portion 1104 are not joined directly together. The flared end 1106a is a geometrical structure that improves plasmonic coupling between the peg 1106 and base portion 1104. A heat sink 1108 joins the base portion 1104, the peg 1106 the write pole 902. The heat sink 1108 has an oval shape in this example, although other shapes may be used, e.g., a shape that follows the contour of the base portion 1104 at one end.

Figure 12:
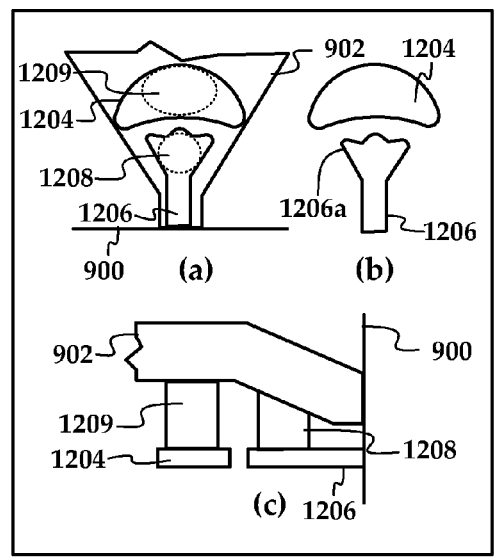

In FIG. 12, an NFT includes a crescent-shaped base portion 1204 and a peg 1206. The peg 1206 has a flared end 1206a that extends towards the base portion 1204. The peg 1206 and base portion 1204 are not joined directly together. The flared end 1206a is a geometrical structure that improves plasmonic coupling between the rod 1206 and base portion 1204. A first heat sink 1208 joins the peg 1206 to the write pole 902, and second heat sink 1209 joins the base portion 1204 to the write pole 902. The heat sinks 1208, 1209 have oval and round shapes in this example, although other shapes may be used. For example, the shape of heat sink 1209 may follow that of the base portion 1204, and the shape of heat sink 1208 may follow that of the flared end 1206a of the peg 1206.

In FIG. 13, an NFT includes two crescent-shaped base portions 1304, 1305 separated by a gap. The peg 1306 has a flared end 1306a that extends towards the gap between the base portions 1304, 1305 however the peg 1306 and base portions 1304, 1305 are not joined directly together. The flared end 1306a is a geometrical structure that improves plasmonic coupling between the rod 1306 and base portion 1304. A first heat sink 1308 joins the peg 1306 to the write pole 902, and second heat sinks 1309, 1310 join the base portions 1304, 1304 to the write pole 902. The heat sinks 1308-1310 have oval and round shapes in this example, although other shapes may be used. For example, the shape of heat sinks 1309, 1310 may follow that of the respective base portions 1304, 1302.

In FIG. 14, an NFT includes two crescent-shaped base portions 1404, 1405 separated by a gap. The peg 1406 has a flared end 1406a that extends towards the gap between the base portions 1404, 1405. The peg 1406 and base portions 1404, 1405 are not joined directly together. The flared end 1406a is a geometrical structure that improves plasmonic coupling between the rod 1406 and base portion 1404. A first heat sink 1408 joins the peg 1406 to the write pole 902, and second heat sink 1409 joins the base portions 1404, 1405 to the write pole 902. The heat sinks 1408, 1409 have oval and round shapes in this example, although other shapes may be used. For example, the shape of heat sinks 1408, 1409 may follow that of the base portions 1404, 1405.

In FIG. 15, an NFT includes two crescent-shaped base portions 1504, 1505 separated by a gap. The peg 1506 has a flared end 1506a that extends towards the gap between the base portions 1504, 1505. The peg 1506 and base portions 1504, 1505 are not joined directly together. The flared end 1506a is a geometrical structure that improves plasmonic coupling between the rod 1506 and base portion 1504. A heat sink 1508 joins both the peg 1506 and the base portions 1504, 1505 to the write pole 902. The heat sink 1508, has a rectangular shape in this example, although other shapes may be used. For example the shape of heat sink 1408 may follow that of the write pole 902.

In FIG. 16, an NFT includes a circular disc-shaped base portion 1604 and a peg 1606. The peg 1606 is rod-shaped and extends to a middle of the base portion 904. The base portion 1604 is has two, concentric sections 1604a-b that are formed of different materials. The sections 1604a-b may be configured to improve any combination of plasmon coupling, heat sinking, adhesion, and diffusion prevention. For example, section 1604a may be formed from a thermally robust material that adheres well to the peg 1606, and section 1604b may be formed from a plasmonic material chosen for efficient plasmonic excitation and coupling. A stadium shape may instead be used for the outer contours of the base portion 1604, as well as the contours of the sections 1604a-b. A heat sink 1608 has a contour that follows that of the base portion 1604 and extends from a major surface of the inner section 1604a of the base portion 1604 to the write pole 902. The heat sink 1608 may be the same size as the outer contours of the base portion 1604 in some embodiments. A lower base portion 1610 may optionally be used similar to the lower base portion 910 in the description of FIG. 9. The lower base portion 1610 may cover one or both sections 1604a-b of the base portion 1610.

Figure 17:
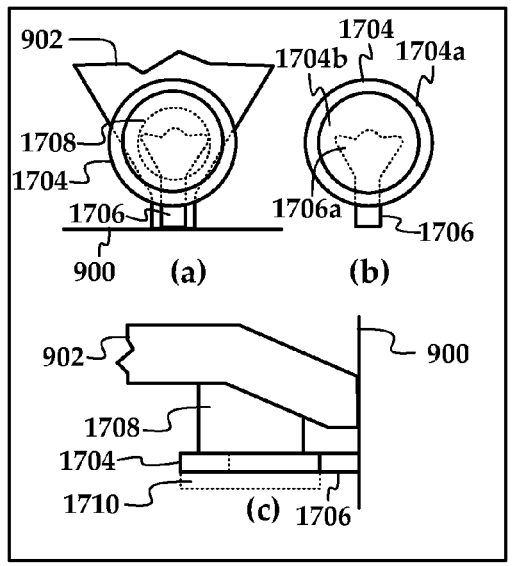

In FIG. 17, an NFT includes a circular disc-shaped base portion 1704 and a peg 1706. The peg 1706 has a flared end 1706a that extends into a center of the base portion 1704. The base portion 1704 is has two, concentric sections 1704a-b that are formed of different materials, and may be configured to improve any combination of plasmon coupling, heat sinking, adhesion, and diffusion prevention. A stadium shape may instead be used for the outer contours of the base portion 1704, as well as the contours of the sections 1704a-b. A heat sink 1708 has a contour that follows that of the base portion 1704 and extends from a major surface of the inner section 1704a of the base portion 1704 to the write pole 902. The heat sink 1708 may be the same size as the outer contours of the base portion 1704 in some embodiments. A lower base portion 1710 may optionally be used similar to the lower base portion 910 in the description of FIG. 9. The lower base portion 1710 may cover one or both sections 1704a-b of the base portion 1710.

Figure 18:
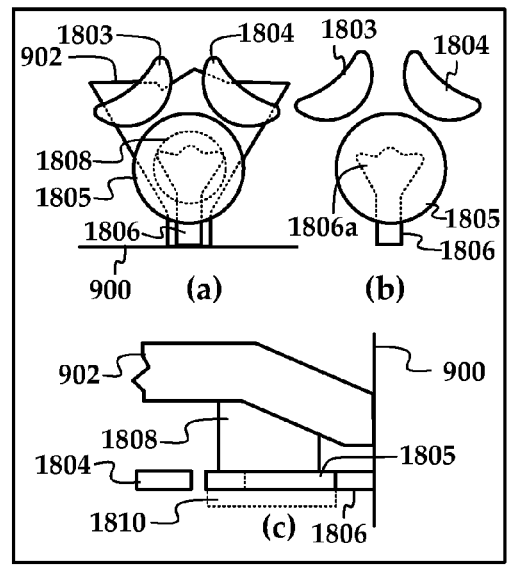

In FIG. 18, an NFT includes multiple base portions 1803-1805 and a peg 1806. The base portions include a disc 1805 (shown circular, but may be stadium-shaped) and two crescent shaped portions 1803, 1804 that are not directly connected to either the disc 1805 or the peg 1806. The peg 1806 has a flared end 1806a that extends into a center of the disc-shaped base portion 1805. A heat sink 1808 has a contour that follows that of the base portion 1805 and extends from a major surface of the base portion 1804 to the write pole 902. The heat sink 1808 may be the same size as the outer contours of the base portion 1804 in some embodiments. A lower base portion 1810 may optionally be used similar to the lower base portion 910 in the description of FIG. 9. The lower base portion 1810 may cover one or both sections 1804a-b of the base portion 1810.

Figure 19:
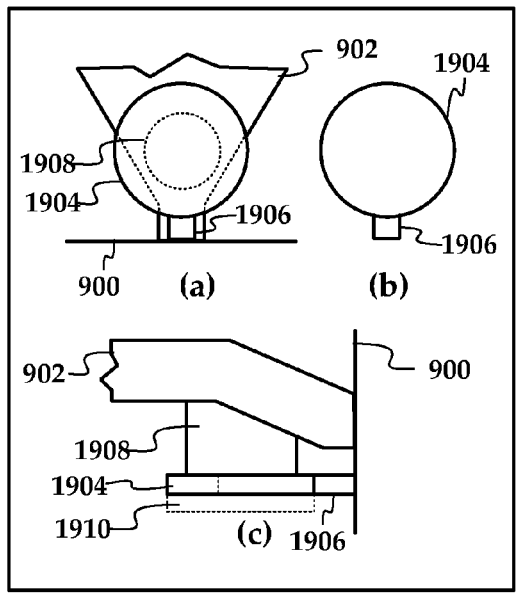

In FIG. 19, an NFT includes a disc-style base portion 1904 and a peg 1906. The peg 1906 is rod-shaped and abuts an edge of the base portion 1904. The base portion 1904 is has a circular contour in this example, although a stadium shape may also be used. A heat sink 1908 extends from a major surface of the base portion 1904 to the write pole 902 and may be configured as described in regards to FIG. 9. A lower base portion 1910 may optionally be used as described in regards to FIG. 9.

Figure 20:
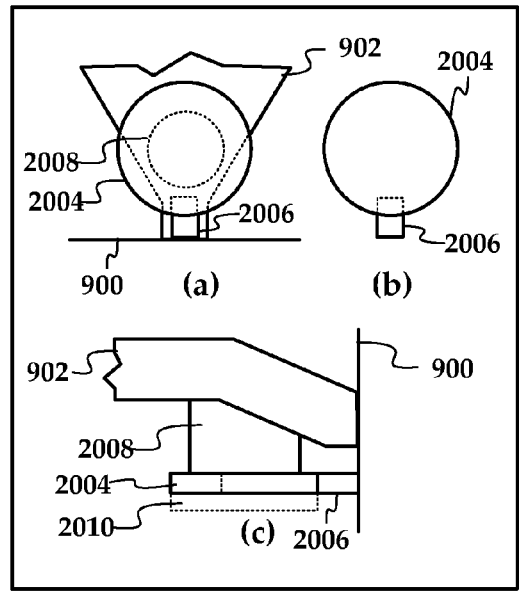

In FIG. 20, an NFT includes a disc-style base portion 2004 and a peg 2006. The peg 2006 is rod-shaped and extends partially into the base portion 2004, e.g., between the center of the base portion 2004 and an edge of the base portion 2004 that faces the recording media. The base portion 2004 has a circular contour in this example, although a stadium shape may also be used. A heat sink 2008 extends from a major surface of the base portion 2004 to the write pole 902 and may be configured as the description of FIG. 9. A lower base portion 2010 may optionally be used as in the description of FIG. 9. The overlap between the peg and the base portion as shown, e.g., in FIGS. 9, 19, and 20 may be chosen to optimize the efficiency, areal density capability and/or reliability of the device.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a near-field transducer comprising:
      first and second stacked base portions comprising a common outline shape, the second base portion being proximate a light delivery structure, the first and second base portions formed of a plasmonic material;
      a peg extending from the first base portion towards a media-facing surface, the peg comprising a peg material that is more thermally robust than the plasmonic material, the peg having a peg thickness that is less than a thickness of the first base portion, the first base portion comprising a first recess proximate the peg, the first recess separating the first base portion from the media-facing surface and exposing at least a top side of the peg; and
   a heat sink proximate the first base portion, the heat sink comprising an angled surface that is proximate to a write pole.

2. The apparatus of claim 1, wherein the peg comprises a taper such that a first cross-section of the peg proximate the media surface is smaller than a second cross-section of the peg proximate the first base portion.

3. The apparatus of claim 1, wherein the heat sink is formed of the plasmonic material.

4. The apparatus of claim 1, wherein an end of the second base portion is separated from the media-facing surface by a second recess, the first recess being larger than the second recess.

5. The apparatus of claim 1, wherein the first recess extends through a full thickness of the first base portion such that sides of the peg are exposed.

6. The apparatus of claim 1, wherein the same outline shape comprises a stadium shape.

7. The apparatus of claim 1, wherein the peg material comprises a refractory material.

8. The apparatus of claim 1, wherein the peg material comprises at least one of Rh, Ir, Pt, Pd, W, Ru, ZrN, and TiN.

9. The apparatus of claim 1, further comprising:
   a waveguide core proximate the second base portion of the near-field transducer; and
   a plasmonic disc proximate a surface of the waveguide core that faces away from the near-field transducer, wherein a first projection of the plasmonic disc onto a substrate-parallel plane overlaps a second projection of the near-field transducer onto the substrate parallel plane.

10. The apparatus of claim 1, wherein the peg extends from a center of the first base portion towards the media-facing surface.

11. The apparatus of claim 10, wherein the peg has a flared end near the center of the base portion, the flared end improving at least one of adhesion and plasmonic coupling between the peg and base portion.

12. An apparatus comprising:
a near-field transducer comprising:
   a base portion formed of a plasmonic material;
   a peg embedded within the base portion and extending from a center of the base portion towards a media-facing surface, the peg comprising a peg material that is more thermally robust than the plasmonic material, the peg having a flared end near the center of the base portion, the flared end improving at least one of adhesion and plasmonic coupling between the peg and base portion; and
   a heat sink on a major surface of the base portion, the heat sink comprising an angled surface that is proximate to a write pole.

13. The apparatus of claim 12, wherein the peg has thickness that is less than that of the base portion, the base portion comprising a recess proximate the peg, the recess separating the base portion from the media-facing surface and exposing at least a top side of the peg.

14. The apparatus of claim 12, further comprising:
a waveguide core proximate the base portion of the near-field transducer; and
a plasmonic disc proximate a surface of the waveguide core that faces away from the near-field transducer, wherein a first projection of the plasmonic disc onto a substrate-parallel plane overlaps a second projection of the near-field transducer onto the substrate parallel plane.

15. An apparatus comprising:
a near-field transducer comprising:
   a base portion having first and second concentric sections that are formed of first and second materials, at least one of the first and second materials comprising a plasmonic material;
   a peg extending from the base portion towards a media-facing surface, the peg comprising a peg material that is more thermally robust than the plasmonic material; and
   a heat sink on a major surface of the base portion, the heat sink comprising an angled surface that is proximate to a write pole.

16. The apparatus of claim 15, wherein the peg has thickness that is less than that of the base portion, the base portion comprising a recess proximate the peg, the recess separating the base portion from the media-facing surface and exposing at least a top side of the peg.

17. The apparatus of claim 15, wherein the peg extends from a center of the first base portion towards the media-facing surface.

18. The apparatus of claim 17, wherein the peg has a flared end near the center of the base portion, the flared end improving at least one of adhesion and plasmonic coupling between the peg and base portion.

19. The apparatus of claim 15, further comprising:
a waveguide core proximate the base portion of the near-field transducer; and
a plasmonic disc proximate a surface of the waveguide core that faces away from the near-field transducer, wherein a first projection of the plasmonic disc onto a substrate-parallel plane overlaps a second projection of the near-field transducer onto the substrate parallel plane.

\* \* \* \* \*